(12) United States Patent
Engle et al.

(10) Patent No.: US 11,480,959 B2
(45) Date of Patent: Oct. 25, 2022

(54) COLLABORATIVE TRAVELING

(71) Applicant: GM GLOBAL TECHNOLOGY OPERATIONS LLC, Detroit, MI (US)

(72) Inventors: Stephanie Olivia Engle, San Francisco, CA (US); Bradley David Ryan, San Francisco, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 338 days.

(21) Appl. No.: 16/103,053

(22) Filed: Aug. 14, 2018

(65) Prior Publication Data
US 2020/0057438 A1  Feb. 20, 2020

(51) Int. Cl.
| | |
|---|---|
| *G05D 1/00* | (2006.01) |
| *G01C 21/34* | (2006.01) |
| *G01C 21/36* | (2006.01) |
| *G06Q 10/02* | (2012.01) |
| *G06Q 50/30* | (2012.01) |

(52) U.S. Cl.
CPC ....... *G05D 1/0027* (2013.01); *G01C 21/3438* (2013.01); *G01C 21/3617* (2013.01); *G05D 1/0088* (2013.01); *G06Q 10/02* (2013.01); *G06Q 50/30* (2013.01); *G05D 2201/0213* (2013.01)

(58) Field of Classification Search
USPC ........................................................ 701/25
See application file for complete search history.

(56) References Cited

U.S. PATENT DOCUMENTS

| | | | | |
|---|---|---|---|---|
| 9,638,535 B2* | 5/2017 | Paek | .................. | G01C 21/3415 |
| 9,778,653 B1* | 10/2017 | McClintock | ........... | B67D 7/348 |
| 10,152,053 B1* | 12/2018 | Smith | .................... | G06Q 10/08 |
| 10,310,500 B1* | 6/2019 | Brady | .................. | G05D 1/0291 |
| 10,545,509 B1* | 1/2020 | Jessen | .................... | B62D 24/00 |
| 10,895,464 B2* | 1/2021 | Yamada | .............. | G01C 21/3438 |
| 10,948,927 B1* | 3/2021 | Harris | ...................... | G08G 1/22 |
| 2003/0158658 A1* | 8/2003 | Hoever | .............. | G01C 21/3605 |
| | | | | 701/533 |

(Continued)

OTHER PUBLICATIONS

"International Search Report for PCT Patent Application No. PCT/US2019/046339", dated Nov. 19, 2019, 5 Pages.

(Continued)

*Primary Examiner* — Krishnan Ramesh
(74) *Attorney, Agent, or Firm* — Calfee, Halter & Griswold LLP

(57) ABSTRACT

An autonomous vehicle including a vehicle propulsion system, a braking system, a steering system, and a computing system that is in communication with the vehicle propulsion system, the braking system, and the steering system. The computing system includes a processor and memory that stores computer-executable instructions that, when executed by the processor, cause the processor to perform acts including setting as a destination for a trip of the autonomous vehicle. The destination for the trip of the autonomous vehicle being set as a location of a second autonomous vehicle at a specific time. The processor is further configured to select a route to the destination for the trip of the autonomous vehicle. The processor is yet further configured to control at least one of the vehicle propulsion system, the braking system, or the steering system to move the autonomous vehicle along the route as selected for the trip.

20 Claims, 9 Drawing Sheets

(56) References Cited

U.S. PATENT DOCUMENTS

| | | | | |
|---|---|---|---|---|
| 2011/0153629 A1* | 6/2011 | Lehmann | ............... | G06Q 30/06 |
| | | | | 707/E17.014 |
| 2012/0239584 A1* | 9/2012 | Yariv | ................ | G01C 21/3438 |
| | | | | 701/302 |
| 2013/0332067 A1* | 12/2013 | Schlesinger | ....... | G01C 21/3438 |
| | | | | 701/422 |
| 2014/0316671 A1* | 10/2014 | Okamoto | ................ | G08G 1/22 |
| | | | | 701/96 |
| 2014/0358353 A1* | 12/2014 | Ibanez-Guzman | ......................... | |
| | | | | B60W 60/0025 |
| | | | | 701/23 |
| 2016/0328669 A1* | 11/2016 | Droege | ............ | G06Q 10/06311 |
| 2017/0370731 A1* | 12/2017 | Bresnahan | ......... | G01C 21/3626 |
| 2017/0371333 A1* | 12/2017 | Nagy | ................... | G05D 1/0088 |
| 2018/0128628 A1* | 5/2018 | Cheaz | ................. | H04W 84/00 |
| 2018/0164106 A1* | 6/2018 | Peterson | ............ | G01C 21/3617 |
| 2018/0202822 A1* | 7/2018 | DeLizio | ............... | G01C 21/362 |
| 2018/0211546 A1* | 7/2018 | Smartt | .................... | H04W 4/46 |
| 2018/0257498 A1* | 9/2018 | Delp | ................... | G01C 21/3469 |
| 2018/0275648 A1* | 9/2018 | Ramalingam | ...... | G01C 21/3438 |
| 2018/0283885 A1* | 10/2018 | Peterson | ............ | G01C 21/3438 |
| 2019/0043001 A1* | 2/2019 | Woulfe | ............. | G01C 21/3438 |
| 2019/0156254 A1* | 5/2019 | Hansen | ............. | G06Q 10/0631 |
| 2019/0206258 A1* | 7/2019 | Chang | ................... | G08G 1/202 |
| 2019/0220037 A1* | 7/2019 | Vladimerou | ......... | G05D 1/0088 |
| 2019/0225142 A1* | 7/2019 | Switkes | ................... | G08G 1/22 |
| 2019/0353495 A1* | 11/2019 | Dyer | .................... | G06V 40/103 |
| 2019/0361451 A1* | 11/2019 | Wilson | .................. | G08G 1/205 |
| 2019/0384324 A1* | 12/2019 | Sager | ............... | G08G 1/096708 |
| 2020/0019894 A1* | 1/2020 | Jin | ........................ | G08G 1/0145 |
| 2020/0041292 A1* | 2/2020 | Sugiyama | ............. | H04W 4/029 |
| 2020/0049521 A1* | 2/2020 | Kotake | ............. | G01C 21/3438 |
| 2020/0062265 A1* | 2/2020 | Wunderlich | ............ | G10L 15/22 |
| 2020/0082392 A1* | 3/2020 | Pishevar | ............. | G06Q 20/385 |
| 2020/0213329 A1* | 7/2020 | Simons | ............... | G06F 21/6254 |

OTHER PUBLICATIONS

"Written Opinion of the International Searching Authority for PCT Patent Application No. PCT/US2019/046339", dated Nov. 19, 2019, 6 Pages.

Bresciani, et al., "Carpooling: facts and new trends", In IEEE 2018 International Conference of Electrical and Electronic Technologies for Automotive, Jul. 9, 2018, pp. 1-4.

Chen, et al., "Smart Ride Share with Flexible Route Matching", In IEEE 13th International Conference on Advanced Communication Technology, Feb. 13, 2011, pp. 1506-1510.

Hsieh, Fu-Shiung, "Car Pooling based on Trajectories of Drivers and Requirements of Passengers", In 2014 IEEE 28th International Conference on Advanced Information Networking and Applications, Mar. 27, 2017, pp. 972-978.

"International Preliminary Report on Patentability for PCT Patent Application No. PCT/US2019/046339", dated Feb. 16, 2021, 7 Pages.

"Reply to Office Action for European Patent Application No. 19759253.8", Filed Date: Aug. 31, 2021, 9 Pages.

* cited by examiner

US 11,480,959 B2

COLLABORATIVE TRAVELING

BACKGROUND

An autonomous vehicle is a motorized vehicle that can operate without human conduction. The autonomous vehicle can be controlled to travel from an initial location (e.g., a pick-up location, a current geographic location) to a destination. The autonomous vehicle can access roadway information to determine a travel route from the source location to the destination.

A destination is oftentimes a fixed location. The fixed location of a destination is commonly communicated by way of explicit input of an address or a location name. For example, when a passenger hails a ride via an autonomous vehicle (or a ride via any ridesharing service), the passenger typically communicates an address (e.g., 123 Pine Street) or location name (e.g., City Park) as the destination for a trip.

In some situations, however, a desired location of a destination may change over time during a ride. By way of illustration, a passenger may be taking the ride to meet a friend. When hailing the ride, the location of the destination may have originally been 555 West Street; this address may have been explicitly communicated when hailing the ride. During the ride, however, the desired location of the destination may change to 222 East Road (e.g., the friend may have stopped at a different location and the passenger may desire to be dropped off at that different location). Since an autonomous vehicle lacks a human driver, the passenger is unable to verbally communicate the change in location of the destination. Rather, the passenger may need to provide explicit input that includes the new address or location name to alter the location of the destination, which can be difficult and time consuming (e.g., assuming that the passenger knows the new address or location name).

SUMMARY

The following is a brief summary of subject matter that is described in greater detail herein. This summary is not intended to be limiting as to scope of the claims.

In accordance with various aspects, provided is an autonomous vehicle. The autonomous vehicle includes a vehicle propulsion system, a braking system, a steering system, and a computing system that is in communication with the vehicle propulsion system, the braking system, and the steering system. The computing system includes a processor and memory that stores computer-executable instructions that, when executed by the processor, cause the processor to perform acts including setting as a destination for a trip of the autonomous vehicle. The destination for the trip of the autonomous vehicle being set as a location of a second autonomous vehicle at a specific time. The processor is further configured to select a route to the destination for the trip of the autonomous vehicle. The processor is yet further configured to control at least one of the vehicle propulsion system, the braking system, or the steering system to move the autonomous vehicle along the route as selected for the trip.

Moreover, in accordance with various aspects, it is contemplated that a method of controlling a dynamic location for a trip of a vehicle can include receiving an input for requesting the trip of the vehicle. The input specifies an identity of a user and a specific time. The method may further include setting, responsive to the input, the dynamic location for the trip of the vehicle as a location of the user at the specific time. The method may yet further include causing the vehicle to move to the dynamic location.

Further, in accordance with various aspects, it is contemplated that a method of controlling a dynamic location for a trip of a vehicle can include transmitting to a user a suggestion for a destination. The suggestion can include a second user and a specific time. The method may further include receiving an input requesting the trip of the vehicle. The input may specify setting a destination for the trip to meet the second user. The method may yet further include setting, responsive to the input, the dynamic location for the trip of the vehicle as a location of the second user at the specific time. The method may include causing the vehicle to move to the dynamic location.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
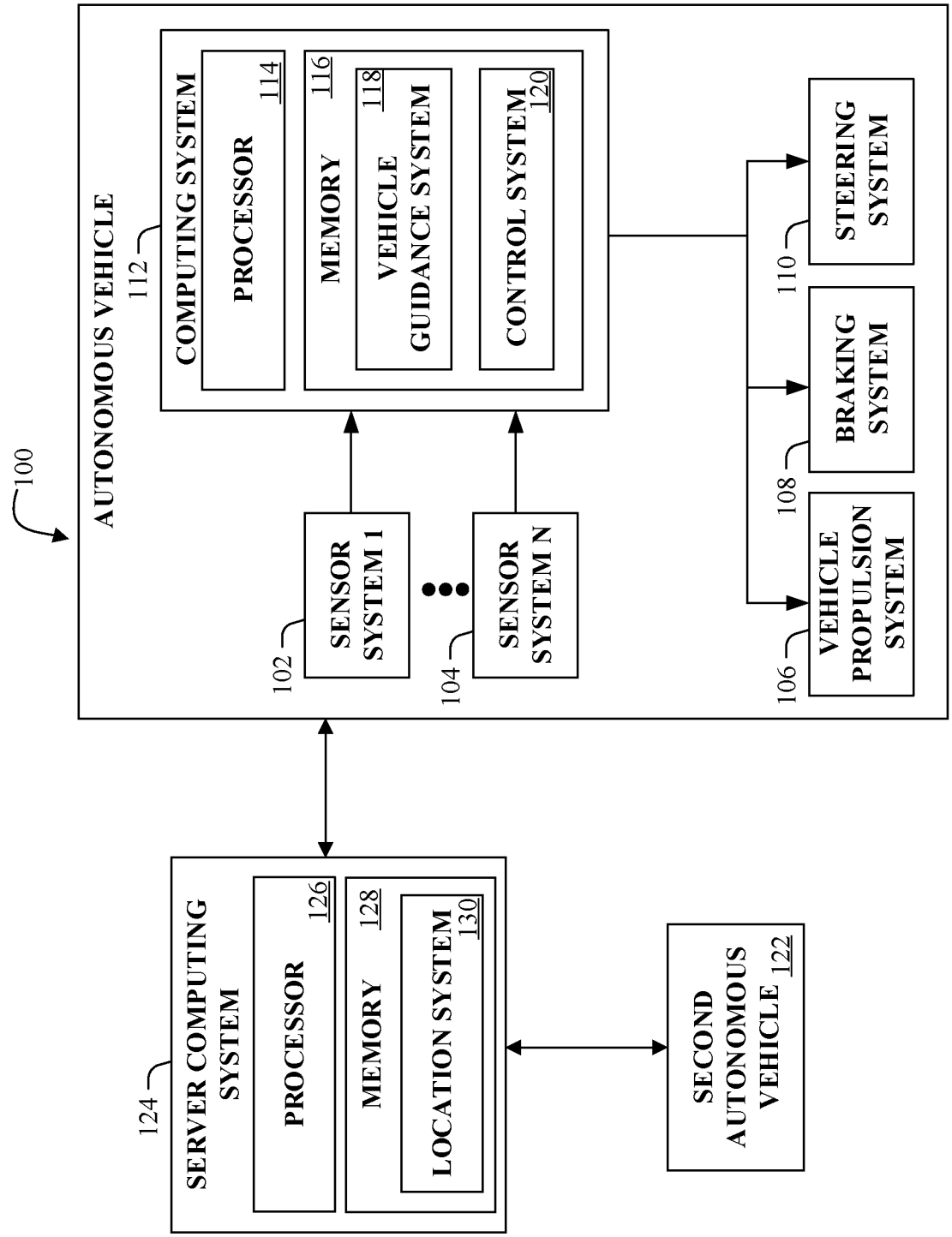
FIG. 1 illustrates an exemplary autonomous vehicle.

Various technologies pertaining to dynamically routing an autonomous vehicle are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Further, as used herein, the term "exemplary" is intended to mean serving as an illustration or example of something and is not intended to indicate a preference.

With reference now to FIG. 1, an exemplary autonomous vehicle 100 is illustrated. The autonomous vehicle 100 can navigate about roadways without human conduction based upon sensor signals output by sensor systems of the autonomous vehicle 100. The autonomous vehicle 100 includes a plurality of sensor systems, namely, a sensor system 1 102, . . . , and a sensor system N 104, where N can be substantially any integer greater than one (collectively referred to herein as sensor systems 102-104). The sensor systems 102-104 are of different types and are arranged about the autonomous vehicle 100. For example, the sensor system 1 102 may be a lidar sensor system and the sensor system N 104 may be a camera (image) system. Other exemplary sensor systems included in the sensor systems 102-104 can include radar sensor systems, GPS sensor systems, sonar sensor systems, infrared sensor systems, and the like.

The autonomous vehicle 100 further includes several mechanical systems that are used to effectuate appropriate motion of the autonomous vehicle 100. For instance, the mechanical systems can include, but are not limited to, a vehicle propulsion system 106, a braking system 108, and a steering system 110. The vehicle propulsion system 106 may be an electric motor, an internal combustion engine, a combination thereof, or the like. The braking system 108 can include an engine brake, brake pads, actuators, and/or any other suitable componentry that is configured to assist in decelerating the autonomous vehicle 100. The steering system 110 includes suitable componentry that is configured to control the direction of the movement of the autonomous vehicle 100.

The autonomous vehicle 100 additionally comprises a computing system 112 that is in communication with the sensor systems 102-104, the vehicle propulsion system 106, the braking system 108, and the steering system 110. The computing system 112 includes at least one processor 114 and memory 116 that includes computer-executable instructions that are executed by the processor 114. In an example, the processor 114 can be or include a graphics processing unit (GPU), a plurality of GPUs, a central processing unit (CPU), a plurality of CPUs, an application-specific integrated circuit (ASIC), a microcontroller, a programmable logic controller (PLC), a field programmable gate array (FGPA), or the like.

The memory 116 includes a vehicle guidance system 118 that may be configured to dynamically control routing of the autonomous vehicle 100. More particularly, the vehicle guidance system 118 can control setting a dynamic location for a trip of the autonomous vehicle 100. For example, the dynamic location for the trip of the autonomous vehicle 100 can be a pick-up location for the trip of the autonomous vehicle 100. Pursuant to another example, the dynamic location for the trip of the autonomous vehicle 100 can be a drop-off location for the trip of the autonomous vehicle 100. In accordance with another example, the dynamic location for the trip of the autonomous vehicle 100 can be a meeting location (e.g., a location at which the autonomous vehicle 100 is to meet a second autonomous vehicle 122 and/or a user).

Moreover, in various embodiments, the vehicle guidance system 118 can set the dynamic location for the trip of the autonomous vehicle 100 as a location of a second autonomous vehicle 122 at a specific time. In yet other embodiments, the vehicle guidance system 118 can set the dynamic location for the trip of the autonomous vehicle 100 as a location of a user at a specific time.

Further, the vehicle guidance system 118 can select a route from a pick-up location (e.g., a geographic location at which a passenger is picked up or to be picked up by the autonomous vehicle 100) and/or a current geographic location of the autonomous vehicle 100 to a destination for the trip of the autonomous vehicle 100. By way of illustration, the vehicle guidance system 118 can select a route to the dynamic location for the trip of the autonomous vehicle 100, where the dynamic location is the destination. Thus, as opposed to conventional approaches where explicit input concerning a fixed location is specified for a destination (e.g., a passenger hailing a ride indicates that the destination is 333 Eagle Avenue), the vehicle guidance system 118 enables the destination to be a location of a differing autonomous vehicle (e.g., the second autonomous vehicle 122) at a specific time and/or a location of a user (e.g., a passenger of the second autonomous vehicle 122, a pedestrian, a user to be picked up by the autonomous vehicle 100, a user to be met, etc.) at a specific time.

The memory 120 additionally includes a control system 120 that is configured to receive an output of the vehicle guidance system 118 and is further configured to control at least one of the mechanical systems (the vehicle propulsion system 106, the braking system 108, and/or the steering system 110) based upon the output of the vehicle guidance system 118. Thus, the control system 120 can control the mechanical system(s) of the autonomous vehicle 100 to move the autonomous vehicle 100 along the route as selected by the vehicle guidance system 118 for the trip to the destination.

The autonomous vehicle 100 can also be in network communication with a server computing system 124 (or a plurality of server computing systems). The autonomous vehicle 100 can wirelessly communicate with the server computing system 124. Data can be transmitted from the server computing system 124 to the autonomous vehicle 100. Further, data can be transmitted from the autonomous vehicle 100 to the server computing system 124. It is contemplated that the server computing system 124 can similarly communicate with the second autonomous vehicle 122 (as well as substantially any number of other autonomous vehicles in a fleet).

While the vehicle guidance system 118 of the autonomous vehicle 100 is described in some embodiments as controlling the setting of the dynamic location for the trip of the autonomous vehicle 100, according to other embodiments, it is contemplated that the server computing system 124 can additionally or alternatively control the setting of the dynamic location for the trip of the autonomous vehicle 100. Thus, the examples described herein can be extended to such scenarios where the server computing system 124 at least partially controls the setting of the dynamic location for the trip of the autonomous vehicle 100. For instance, the server computing system 124 can set a destination for a trip of the autonomous vehicle 100 and send a command specifying the destination to the autonomous vehicle (e.g., to the vehicle guidance system 118).

The server computing system 124 can include at least one processor 126 and memory 128 that includes computer-executable instructions that are executed by the processor 126. The memory 128 includes a location system 130 that may be configured to track a location of the second autonomous vehicle 122 over time. Moreover, the location system 130 can store historical location data indicative of the tracked location of the second autonomous vehicle 122 over time. The location system 130 can similarly track other autonomous vehicles in the fleet over time (including the autonomous vehicle 100), and store corresponding historical location data. Accordingly, the vehicle guidance system 118 of the autonomous vehicle 100 can interact with the server computing system 124 to obtain current location data of other autonomous vehicles, historical location data of other autonomous vehicles, anticipated location data of other autonomous vehicles, and so forth.

Various exemplary scenarios are now described; in the following exemplary scenarios, a destination for a trip of the autonomous vehicle 100 is controlled based on a location of a second autonomous vehicle 122 at a specific time. Thus, in the following exemplary scenarios, the destination for the trip is the dynamic location. The vehicle guidance system 118 can set the destination for the trip of the autonomous vehicle 100. In particular, the destination for the trip of the autonomous vehicle 100 can be set as a location of the second autonomous vehicle 122 at a specific time. The vehicle guidance system 118 can further select a route to the destination for the trip of the autonomous vehicle 100. Additionally, the control system 120 can control the vehicle propulsion system 106, the braking system 108, and/or the steering system 110 to move the autonomous vehicle 100 along the route to the destination as selected for the trip.

According to an example, the vehicle guidance system 118 can control the destination for the trip of the autonomous vehicle 100 to be a drop-off location for a differing trip of the second autonomous vehicle 122. An input (e.g., received by the autonomous vehicle 100, received by the server computing system 124, provided by a mobile computing device of a passenger of the autonomous vehicle 100) can cause the destination for the trip of the autonomous vehicle 100 to be set based on a drop-off location for a differing trip of the second autonomous vehicle 122. Thus, the vehicle guidance system 118 can control, based on the input, the destination for the trip of the autonomous vehicle 100 to be the drop-off location of the differing trip of the second autonomous vehicle 100. For instance, the drop-off location for the differing trip of the second autonomous vehicle 122 can be for a current trip of the second autonomous vehicle 122, a prior trip of the second autonomous vehicle 122, or a future trip of the second autonomous vehicle 122.

Following the foregoing example, pursuant to an illustration, the above-noted input can indicate that the differing trip of the second autonomous vehicle 122 is a current trip of the second autonomous vehicle 122. The current trip of the second autonomous vehicle 122 is ongoing at a time of receipt of the input. For instance, the current trip can be ongoing when the input is received by the autonomous vehicle 100, by the server computing system 124, or the like. Accordingly, the vehicle guidance system 118 can receive data indicating an anticipated drop-off location for the current trip of the second autonomous vehicle 122 from the server computing system 124 (e.g., from the location system 130); the vehicle guidance system 118 can control the destination for the trip of the autonomous vehicle 100 to similarly be the anticipated drop-off location for the current trip of the second autonomous vehicle 122 indicated in the data received from the server computing system 124. Moreover, data indicating a modification to the anticipated drop-off location for the current trip of the second autonomous vehicle 122 (if any) can be communicated from the location system 130 of the server computing system 124 to the vehicle guidance system 118; accordingly, the vehicle guidance system 118 can dynamically adjust the destination for the trip of the autonomous vehicle 100 based on the modification to the anticipated drop-off location. Likewise, data indicating an actual drop-off location for the current trip of the second autonomous vehicle 122 can be communicated (from the location system 130 of the server computing system 124 to the vehicle guidance system 118 of the autonomous vehicle 100) and used by the vehicle guidance system 118 to dynamically adjust the destination for the trip of the autonomous vehicle 100.

According to another illustration, the input can indicate that the differing trip of the second autonomous vehicle 122 is a future trip of the second autonomous vehicle 122. A time of receipt of the input is before commencement of the future trip of the second autonomous vehicle 122. The future trip of the second autonomous vehicle 122 may be scheduled at the time of receipt of the input, for instance; however, it is contemplated that the future trip need not be scheduled at the time of receipt of the input. Once the future trip of the second autonomous vehicle 122 begins (after receipt of the input), data indicating an anticipated drop-off location of the second autonomous vehicle 122 can be received by the vehicle guidance system 118 of the autonomous vehicle 100 from the location system 130 of the server computing system 124. The vehicle guidance system 118 can control the destination for the trip of the autonomous vehicle 100 to similarly be the anticipated drop-off location. Similar to above, data indicating a modification to the anticipated drop-off location and/or an actual drop-off location for the trip of the second autonomous vehicle 122 can be communicated to the vehicle guidance system 118 of the autonomous vehicle 100 and used to dynamically adjust the destination for the trip of the autonomous vehicle 100.

Pursuant to yet another illustration, the input can indicate that the differing trip of the second autonomous vehicle 122 is a prior trip of the second autonomous vehicle 122. The prior trip of the autonomous vehicle 122 ended before a time of receipt of the input. For instance, the input can specify setting the destination to the destination of Mary's trip in a particular autonomous vehicle (e.g., the second autonomous vehicle 122) at noon yesterday. Accordingly, data indicating a drop-off location of the second autonomous vehicle 122 that provided a ride to Mary on the prior day at noon can be communicated from the location system 130 of the server computing system 124 to the vehicle guidance system 118 of the autonomous vehicle 100. Further, the autonomous vehicle 100 can control the destination for the trip of the autonomous vehicle 100 to similarly be the drop-off location specified in the received data.

It is contemplated that the second autonomous vehicle 122 can be selected from a fleet of autonomous vehicles in various manners when being used to set the destination of the trip of the autonomous vehicle 100. According to an example, an input (e.g., received by the autonomous vehicle 100, received by the server computing system 124, provided by a mobile computing device of a passenger of the autonomous vehicle 100) can specify setting the destination for a trip to meet a passenger of the second autonomous vehicle 122. The passenger of the second autonomous vehicle 122 may be riding in the second autonomous vehicle 122 at time of receipt of the input, at a specific time specified in the input, at a future time, or the like.

Moreover, it is also to be appreciated that the destination of the trip of the autonomous vehicle 100 need not be controlled to be a drop-off location of a differing trip of the second autonomous vehicle 122, but rather some other location on the differing trip of the second autonomous vehicle 122. For instance, the destination of the trip of the autonomous vehicle 100 can be controlled to be the location of the second autonomous vehicle 122 at the specific time, where the location of the second autonomous vehicle 122 is on a route of the differing trip of the second autonomous vehicle 122 prior to the second autonomous vehicle 122 reaching a drop-off location for the differing trip. Thus, the autonomous vehicle 100 can meet the second autonomous vehicle 122 at a location along the route (e.g., if the passenger of the autonomous vehicle 100 wants to switch from riding in the autonomous vehicle 100 to riding in the second autonomous vehicle 122 to join with passenger(s) of the second autonomous vehicle 122).

Further, it is contemplated that the destination for the trip of the autonomous vehicle 100 can be dynamically adjusted based on a modification to the location of the second autonomous vehicle 122 at a specific time. While modifications to the drop-off location are described above, it is also contemplated that other location modifications are intended to fall within the scope of the hereto appended claims (e.g., if the route of the trip of the second autonomous vehicle 122 is modified and the vehicle guidance system 118 is controlling the autonomous vehicle 100 to meet at a location along the route of the second autonomous vehicle 122, then the meeting location can be dynamically adjusted).

Moreover, it is to be appreciated that the location of the second autonomous vehicle 122 at the specific time can be an anticipated location of the second autonomous vehicle 122 at a specific future time. For instance, the anticipated location of the second autonomous vehicle 122 at the specific future time can an anticipated drop-off location of the second autonomous vehicle 122; yet, other anticipated locations and specific future times are intended to fall within the scope of the hereto appended claims.

Figure 2:
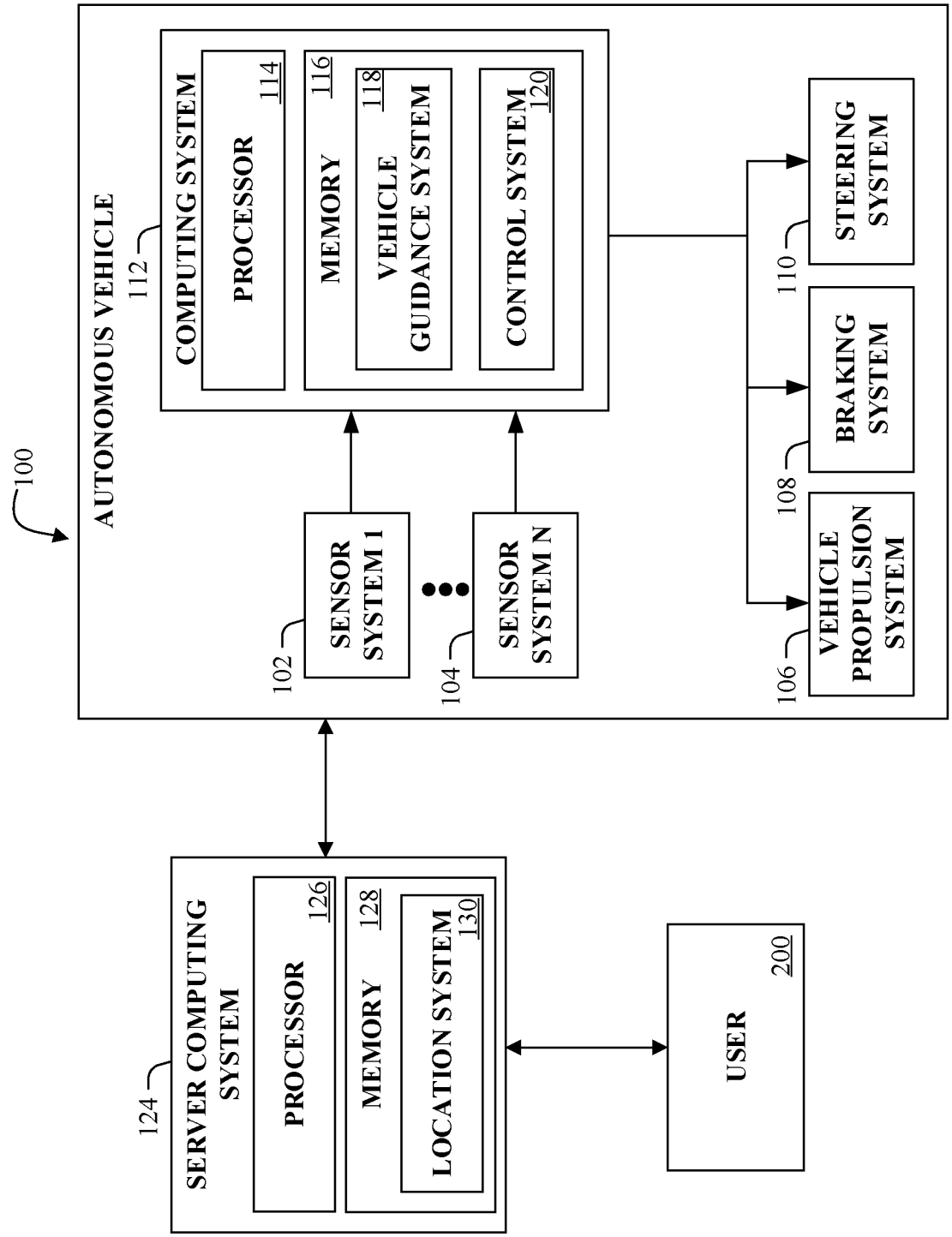
FIG. 2 illustrates an exemplary autonomous vehicle.

With reference to FIG. 2, illustrated is another example of the autonomous vehicle 100 and the server computing system 124. In the example set forth in FIG. 2, the dynamic location for a trip of the autonomous vehicle 100 is set as a location of a user 200 at a specific time. Thus, instead of using the location of the second autonomous vehicle 122 as set forth above in FIG. 1, the dynamic location can be set as the location of the user 200 at the specific time. It is contemplated that the vehicle guidance system 118 of the autonomous vehicle 100 can set the dynamic location for the trip of the autonomous vehicle 100 as the location of the user 200 at the specific time (e.g., using data received from the server computing system 124 indicating the location of the user 200 at the specific time). Additionally, or alternatively, it is to be appreciated that the server computing system 124 can set the dynamic location for the trip of the autonomous vehicle 100 as the location of the user 200 at the specific time.

Pursuant to an example, the location of the user 200 can be identified based on a location of a mobile computing device of the user. According to another example, the location of the user 200 can be identified based on a location of an autonomous vehicle in which the user 200 is riding.

According to an illustration, the user 200 can be a passenger who is hailing a ride in the autonomous vehicle 100. Following this illustration, the user 200 may be in motion after requesting a trip in the autonomous vehicle 100. Thus, a pick-up location for the user 200 can be set, responsive to an input requesting the trip in the autonomous vehicle 100, to be the location of the user 200 at a specific time (e.g., the anticipated location of the user 200 at the anticipated time of pickup). The control system 120 can further cause the autonomous vehicle 100 to move to the pick-up location.

By way of another illustration, an input requesting a trip of the autonomous vehicle 100 for a passenger to be picked up can specify an identity of a differing user (e.g., the user 200) at a specific time. For instance, the input can specify setting a destination for the trip to meet the user 200. Accordingly, the vehicle guidance system 118 can set the dynamic location for the trip of the autonomous vehicle 100 as a location of the user 200 at the specific time. Further, the control system 120 can cause the autonomous vehicle 100 to move to the dynamic location.

Figure 3:
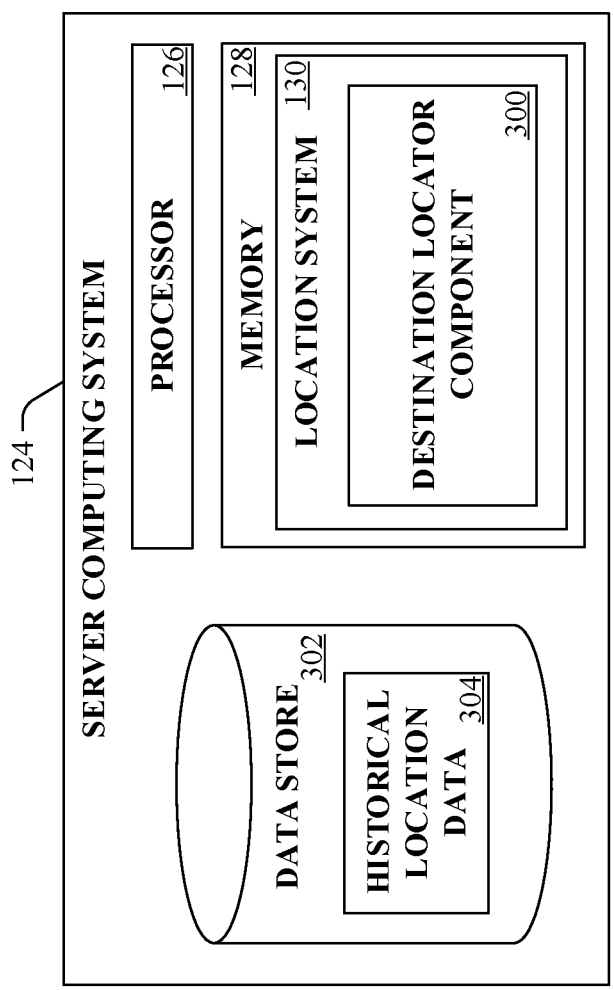
FIG. 3 illustrates an exemplary server computing system.

Now turning to FIG. 3, the server computing system 124 can include at least one processor 126 and memory 128 that includes computer-executable instructions that are executed by the processor 126. The memory 128 includes the location system 130 configured to determine a location for a destination for a trip of a vehicle. The location system 130 may include a destination locator component 300. The server computing system 124 further include a data store 302 which may include historical location data 304. The historical location data 304 may include at least one of tracked locations associated with a vehicle, tracked locations associated with a mobile computing device, or tracked locations associated with a user.

As discussed above, the destination locator component 300 is configured responsive to an input to determine a location for a destination of a trip of a vehicle. The destination locator component 300 may be further configured to transmit the location of the destination to the vehicle. Because the destination may not be a fixed a location, the destination locator component 300 is further configured to dynamically adjust the location of the destination based on a modification to the location of the destination (e.g., the second autonomous vehicle 122 or the user 200 moves). The destination locator component 300 then transmits the dynamically adjusted location of the destination to the vehicle.

The destination may comprise a pick-up location (e.g., a geographic location at which a passenger is picked up or to be picked up) or a drop-off location (e.g., a geographic location at which a passenger is dropped off or to be dropped off). Additionally, as discussed above, the destination may comprise a location of another vehicle at a specific time or another user at a specific time.

Various exemplary scenarios are now described; in the following exemplary scenarios, the vehicle comprises the autonomous vehicle 100 of FIGS. 1-2. However, it is contemplated that the vehicle can additionally, or alternatively, be human driven. For example, where the vehicle is human driven the destination locator component 300 may send the location of the destination to a route planning system (e.g., GPS, internet-based mapping service, etc.). The route planning system then determines a route to the destination for the human driver to take to the destination. In another example, the autonomous vehicle is part of a fleet of autonomous vehicles that may be in contact with each other.

In one embodiment, the input specifies the user 200 and a specific time. Responsive to the input, the destination locator component 300 is configured to set a dynamic location for the trip of the autonomous vehicle 100 as a location of the user 200 at the specific time.

As will be further described below, the specific time can comprise a past, present, or future time. The destination for the trip of the vehicle may be dynamically adjusted based on a modification to the location of the user at the specific time. Pursuant to one illustration, the location of the user 200 at the specific time is an anticipated location of the user 200 at a specific future time. The specific future time is after receipt of the input specifying the user 200 and the specific future time by the destination locator component 300.

Pursuant to another illustration, the location of the user at the specific time is a prior location of the user at a specific prior time. The specific prior time is before receipt of the input specifying the user and the specific prior time by the destination locator component 300.

Pursuant to yet another illustration, the input is from a passenger who is hailing a ride in the autonomous vehicle 100. For example, the destination locator component 300 then determines a location of the passenger to set as a destination of a trip for the autonomous vehicle 100. The destination locator component 300 then supplies this destination to the autonomous vehicle 100 causing the autonomous vehicle 100 to move along a route to the destination. The passenger may be in motion after requesting the ride in the autonomous vehicle 100. Thus, the destination locator component 300 may be further configured to dynamically adjust the destination based on an adjusted location of the user 200. The destination locator component 300 then supplies the adjusted destination to the autonomous vehicle 100.

In another example, the destination locator component 300 sets as a destination of a trip for the autonomous vehicle 100 an anticipated location of the user 200 at an anticipated time of pickup. The anticipated time of pickup can be selected by the user 200 or can be based on how long it will take the vehicle to reach the user. The destination locator component 300 then transmits the anticipated location to the autonomous vehicle 100 causing the autonomous vehicle 100 to move along a route to the destination. The destination locator component 300 may be configured to dynamically adjust the destination based on modifications to the anticipated location of the user 200.

By way of another example, the input is from a second user riding in the autonomous vehicle 100 to go to a location of the user 200. Where a prior location of the user 200 is selected for the destination, the destination locator component 300 may be configured to access the historical location data to determine a location of the user 200 at the specific prior time. For example, the destination could be set as restaurant Stephanie went to last Friday at 5 p.m. The destination locator component 300 then access the historical location data 304 to determine the location of the restaurant Stephanie went to last Friday at 5 p.m.

Pursuant to another example, an anticipated location of the user 200 selected as the destination. The destination locator component 300 is configured to transmit the anticipated location as a destination for the autonomous vehicle 100. Data indicating modification to the anticipated location for the user 200 is used by the destination locator component 300 to dynamically adjust the location of the destination. The destination locator component 300 then transmits the adjusted location to the destination.

In a yet further example, the location of the user 200 selected as a destination is a dynamic location of the user 200. The destination locator component 300 can determine the location of the user 200 at the time the input is received and to set this location as the destination. The dispatch locator component 300 then transmits the destination to the autonomous vehicle 100. Data indicating a modification to the location of the user 200 (if any) is used by the destination locator component 300 to dynamically adjust the destination. The destination locator component 300 is configured to then transmit the adjusted destination to the autonomous vehicle 100.

Figure 4:
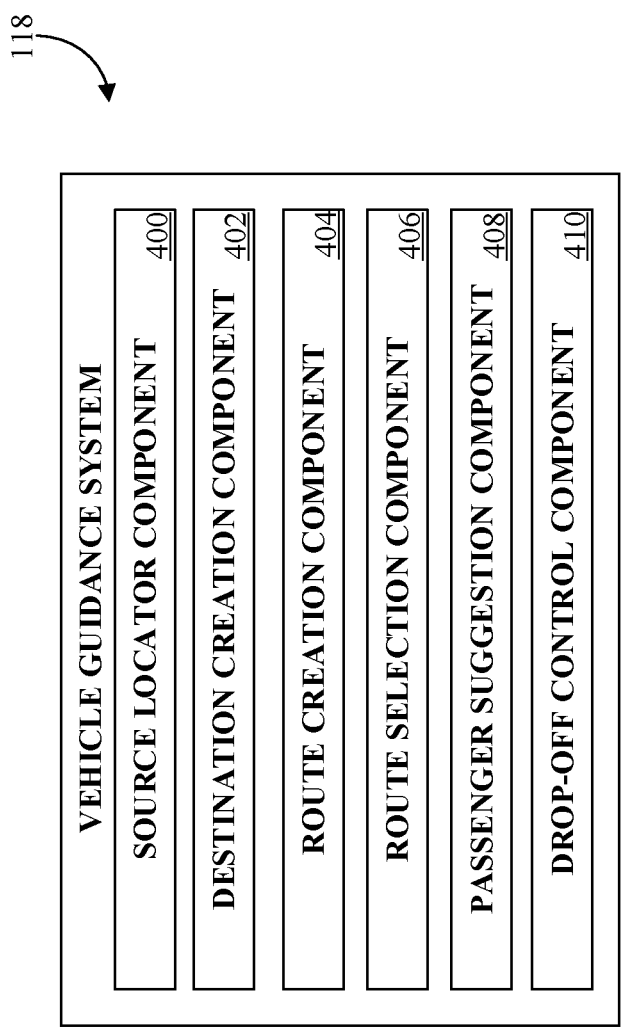
FIG. 4 is a functional block diagram of an exemplary vehicle guidance system.

As shown in FIG. 4, the vehicle guidance system 118 may include a source locator component 400, a destination creation component 402, a route creation component 404, a route selection component 406, a passenger suggestion component 408, and/or a drop-off control component 410.

The source locator component 400 is configured to determine an initial geolocation of the autonomous vehicle 100. The initial geolocation of the autonomous vehicle 100 may be determined based on the sensor systems 102-104 arranged about the autonomous vehicle 100. Any system capable of determining a geolocation of the autonomous vehicle 100 is considered.

The destination creation component 402 is configured to receive data from the server computing system 124 specifying the destination for the autonomous vehicle 100. The destination creation component 402 sets the geolocation of the destination as an end point of a route to be selected. For instance, the data specifying the destination may be received when a passenger hails the autonomous vehicle 100. By way of illustration, a passenger may input the destination into a mobile computing device which transmits the data specifying the destination to the server computing system 124. The data specifying the destination for the passenger, for example, can be transmitted from server computing system 124 to the autonomous vehicle 100.

The route creation component 404 is configured to interact with the destination creation component 402 and to calculate at least one route from the initial location to the destination location. The computing system 116 may calculate the at least one route by accessing roadway information (e.g., maintained by the server computing system 124) to obtain roadways to plot at least one route from the initial location to the destination.

The route selection component 406 is configured to select a route for the autonomous vehicle 100. The route selection component 406 can select the route from a list of at least one potential route calculated by the autonomous vehicle 100 via the route creation component 404 and/or the server computing system 124.

The passenger suggestion component 408 is configured to suggest at least one user a passenger can carpool with in an autonomous vehicle 100. In one embodiment, if a passenger selects a suggested user, the autonomous vehicle 100 will be routed via the route creation component 404 to the suggested user. In another embodiment, if a passenger selects a suggested user, an autonomous vehicle 100 the suggested user is riding in will be routed to a pick-up location for the passenger.

In one embodiment, a user can be suggested based on a selected route for the passenger and a selected route for the user having roadways in common above a threshold amount. The threshold amount can vary based on the length of the passenger's route and/or the user's route, the length of the roadways in common, preference of the passenger, gender of the passenger and/or the user, age of the passenger or the user, time of day, or the like. In another embodiment, a user can be suggested based on the passenger and the user going to the same destination.

In a further embodiment, a user can be suggested based on historical data of the user. The historical data can include previous routes traversed by user or previous destinations of the user. In one version, a user is suggested based on a route of the passenger and a number of historical routes above a threshold traveled by the user having roadways in common with the passenger. In another version, a user is suggested based on the number of times the user set the same destination as the destination set by the passenger. In a yet further version, a user is suggested based on how recently the user traveled to the same destination as the destination set by the passenger.

The passenger suggestion component 408 may be further configured to filter a user(s) found by the aforementioned embodiments before suggesting a user to the passenger. In one embodiment, the passenger suggestion component 408 filters users based on a preference of the passenger. The preference of the passenger can include favoriting a user(s), wanting only user(s) in a network of the passenger, wanting only user(s) the passenger has previously carpooled with, or the like. Data specifying the passenger preference, for example, can be transmitted from a mobile computing device to the autonomous vehicle 100 (e.g. directly via a short-range communication component of a mobile computing device or via the server computing system 124). In another embodiment, the passenger suggestion component 408 filters users based on pattern data collected by the passenger suggestion component 408. For example, the pattern data may include previous user(s) the passenger has rode with, feedback data from the passenger regarding user(s) the passenger has rode with, suggested user(s) the passenger has selected, or the like.

The drop-off control component 410 is configured to control movement of the autonomous vehicle 100 at a drop-off location (e.g., a geographical location at which the passenger is to be dropped off by the autonomous vehicle 100). The drop-off control component 410 may halt directional movement of the autonomous vehicle 100 for a set period of time when the autonomous vehicle 100 reaches the drop-off location. Halting directional movement of the autonomous vehicle 100 for the set period of time allows the passenger to return to the autonomous vehicle 100 if the passenger feels unsafe or uncomfortable travelling from the drop-off location to the destination.

The period of time may be based on a preference of the passenger of the autonomous vehicle 100, identification information about the passenger, the drop-off location, distance from the drop-off location to a destination, chronological information, or the like. For example, when the drop-off is at night (e.g., after 9 p.m. or after sunset), the set period of time may be longer than it would be during the day. In another example, when the drop-off location is far from the destination, the set period of time will be longer than if the drop-off location was closer to the destination. In a yet further example, where the passenger is a child, the period of time may be longer than if the passenger was an adult.

The drop-off control component 410 may be further configured to monitor at least one of an interior of the autonomous vehicle 100 or an environment in a vicinity of an exterior of the autonomous vehicle 100 when the autonomous vehicle 100 is at the drop-off location. The drop-off control component 410 may be further configured to track a passenger of the autonomous vehicle 100 as the passenger travels from the autonomous vehicle to an entrance for a destination (e.g. front door, garage door, vestibule, etc.) when the autonomous vehicle 100 is at the drop-off location.

The drop-off control component 410 may receive data from the sensor system 102-104 which may be configured to capture the environment in the vicinity of the exterior of the autonomous vehicle 100 while the passenger travels from the autonomous vehicle 100 to an entrance for the destination. The drop-off control component 410 may further receive data from an in-cabin camera 502, shown in FIG. 5, configured to monitor an interior of the autonomous vehicle 100. In one example, the in-cabin camera 502 continuously monitors the interior of the autonomous vehicle 100 from the time the autonomous vehicle 100 reaches the drop-off location until the passenger reaches an entrance for the destination. In another embodiment, the in-cabin camera 502 monitors the interior of the autonomous vehicle 100 only while the passenger is in the autonomous vehicle 100.

Figure 5:
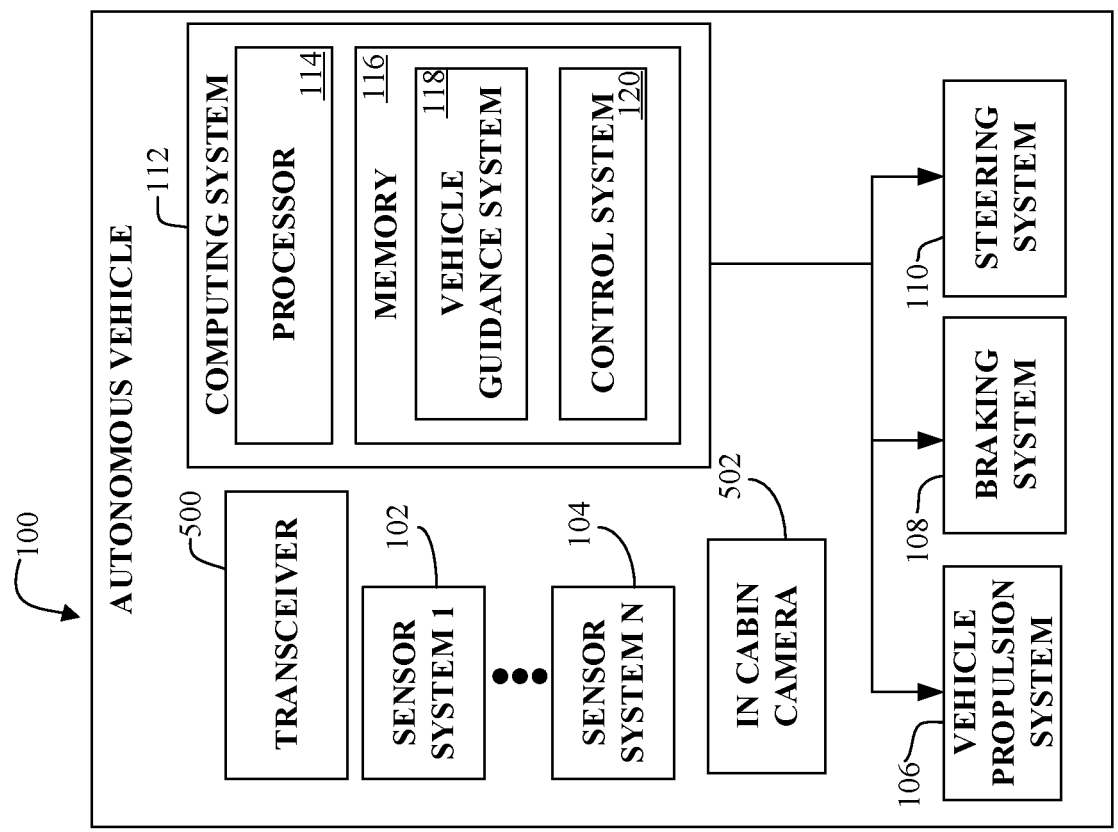
FIG. 5 illustrates an exemplary autonomous vehicle.

As shown in FIG. 5, the autonomous vehicle 100 may further include a transceiver 500 and/or an in-cabin camera 502. The transceiver 500 is configured to transmit data from the autonomous vehicle 100 and/or receive data at the autonomous vehicle 100. Thus, the autonomous vehicle 100 can exchange data with the server computing system 124 and/or a mobile computing device via the transceiver 500. The in-cabin camera 502 is configured to monitor an interior of the autonomous vehicle 100. In an embodiment, the in-cabin camera 502 is configured to remain active while a passenger is in the autonomous vehicle 100. In another embodiment, the in-cabin camera 502 is configured to activate based on an input from a passenger of the autonomous vehicle 100. The input can signify that the passenger feels uncomfortable inside the autonomous vehicle 100.

Figure 6:
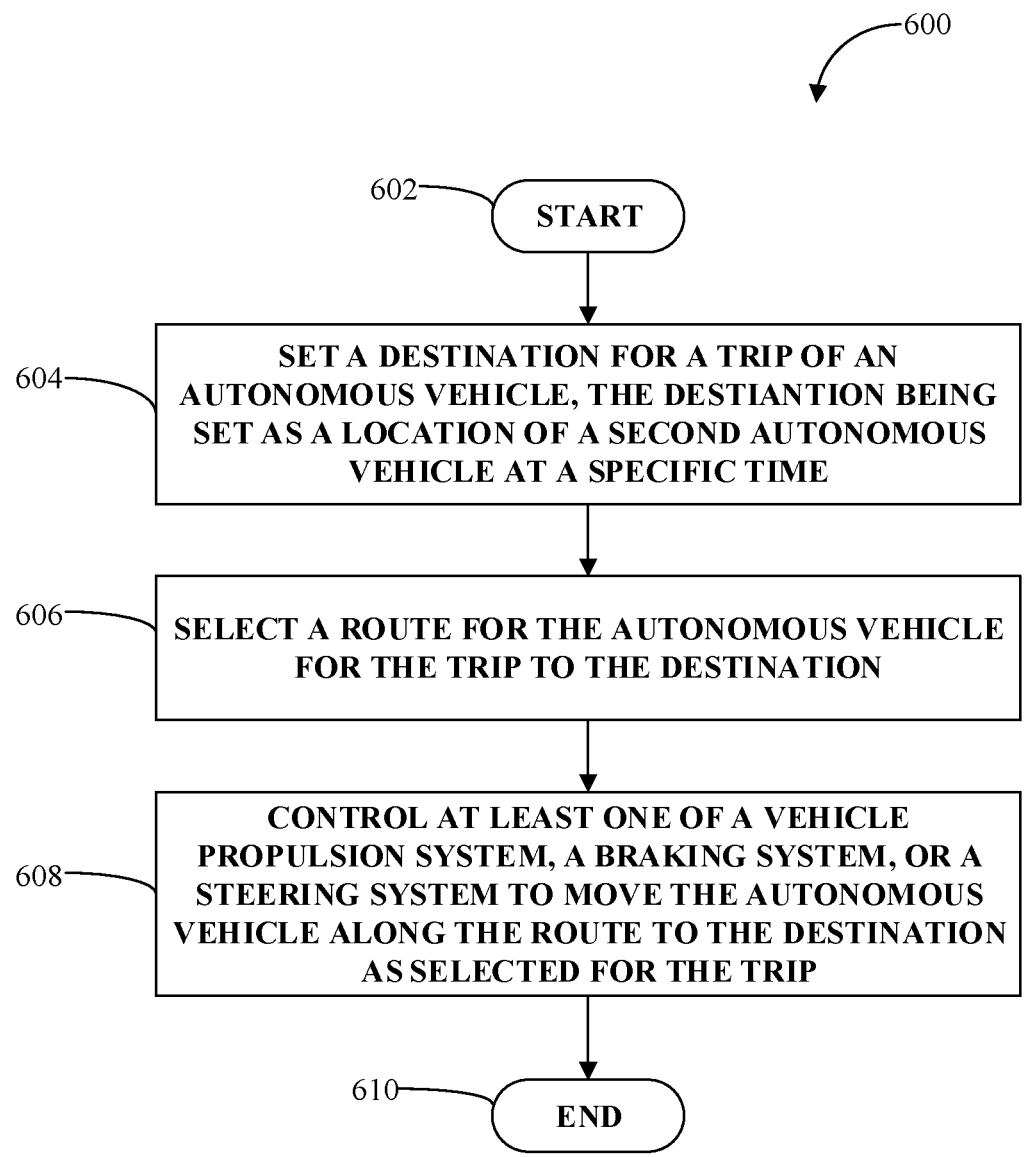
FIG. 6 is a flow diagram that illustrates an exemplary methodology executed by an autonomous vehicle computing system that facilitates movement of the autonomous vehicle.
Figure 7:
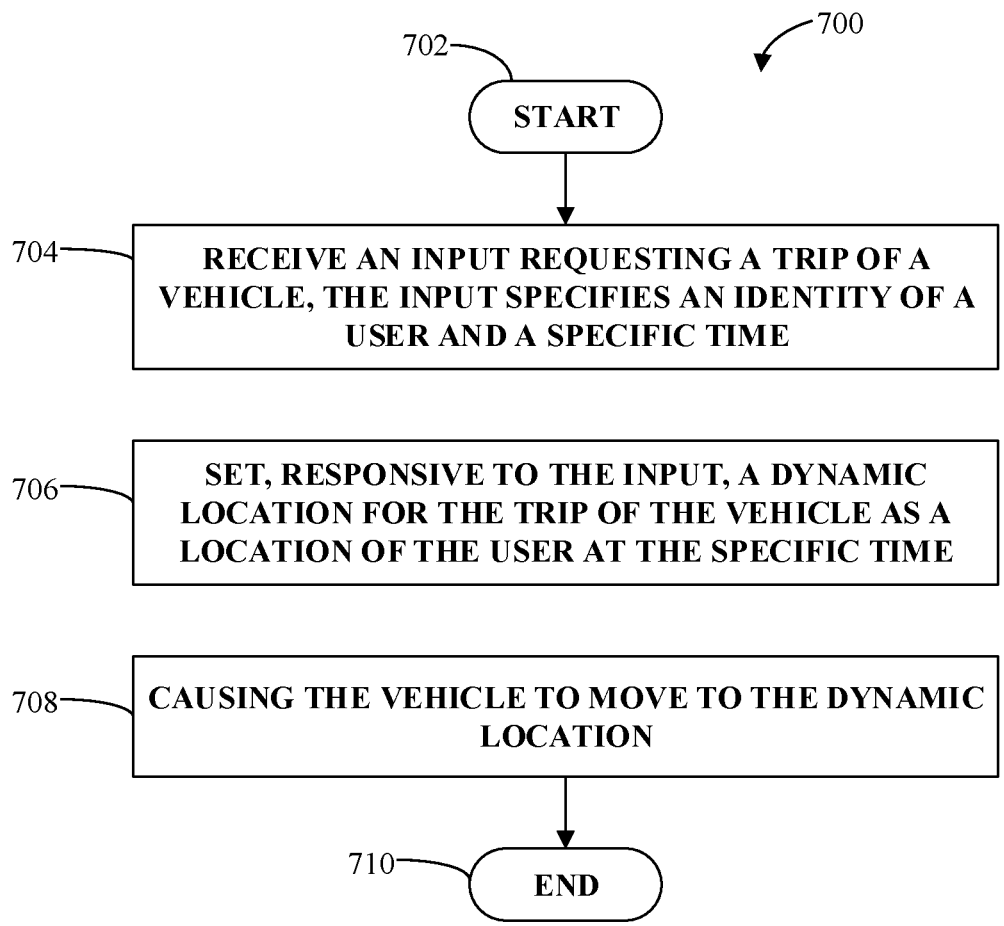
FIG. 7 is a flow diagram that illustrates an exemplary methodology that facilitates controlling a dynamic location for a trip of a vehicle.
Figure 8:
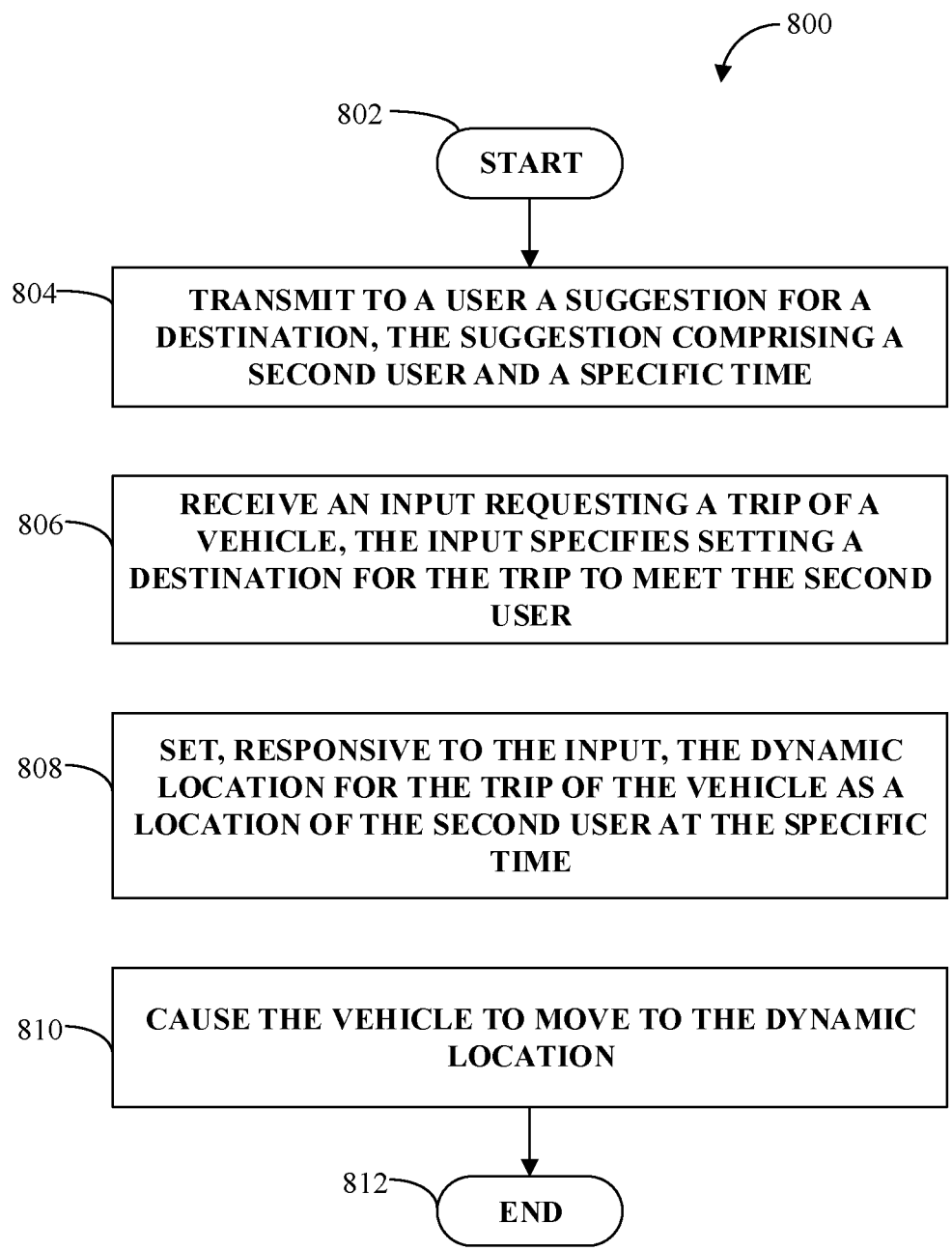
FIG. 8 is a flow diagram that illustrates an exemplary methodology that facilitates controlling a dynamic location for a trip of a vehicle.

FIGS. 6-8 illustrate exemplary methodologies relating to controlling an autonomous vehicle. While the methodologies are shown as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium displayed on a display device, and/or the like.

Referring now to FIG. 6, an exemplary methodology for controlling operation of an autonomous vehicle is illustrated. The methodology 600 starts at 602, and at 604 a processor in the autonomous vehicle sets as a destination for a trip of the autonomous vehicle. The destination for the trip of the autonomous vehicle is set as a location of a second autonomous vehicle at a specific time. At 606, the processor selects a route for the autonomous vehicle for the trip to the destination. At 608, the autonomous vehicle is operated by controlling at least one of a vehicle propulsion system, a braking system, or a steering system to move the autonomous vehicle along the route as selected for the trip to the destination. The methodology 600 concludes at 610.

In one embodiment, setting the destination for the trip of the autonomous vehicle further includes controlling the destination for the autonomous vehicle to be a drop-off location for a differing trip of the second autonomous vehicle. In another embodiment, an input causes the destination for the trip of the autonomous vehicle to be set based on a drop-off location for a differing trip of the second autonomous. Setting the destination for the trip of the autonomous vehicle further includes controlling, based on the input, the destination for the trip of the autonomous vehicle to be the drop-off location for the differing trip of the second autonomous vehicle. In a version of this embodiment, the input indicates that the differing trip of the second autonomous vehicle be a current trip of the second autonomous. The current trip of the second autonomous vehicle is ongoing at a time of receipt of the input. In another version of this embodiment, the input indicates that the differing trip of the second autonomous vehicle be a future trip of the second autonomous vehicle. A time of receipt of the input is before commencement of the future trip of the second autonomous vehicle. In a yet further version of this embodiment, the input indicates that the differing trip of the second autonomous vehicle be a prior trip of the second autonomous vehicle. The prior trip of the second autonomous vehicle ended before a time of receipt of the input.

In another embodiment, setting the destination for the trip of the autonomous vehicle further includes controlling the destination for the trip of the autonomous vehicle to be the location of the second autonomous vehicle at the specific time. The location of the second autonomous vehicle at the specific time is on a differing route for a differing trip of the second autonomous vehicle prior to the second autonomous vehicle reaching a drop-off location for the differing trip In a further embodiment, the second autonomous vehicle is selected from a fleet of autonomous vehicles based on an input that specifies setting the destination for the trip to meet a passenger of the second autonomous vehicle. In a yet further embodiment, the destination for the trip of the autonomous vehicle is dynamically adjusted based on a modification to the location of the second autonomous vehicle at the specific time. In another embodiment, the location of the second autonomous vehicle at the specific time is an anticipated location of the second autonomous vehicle at a specific future time Referring now to FIG. 7, an exemplary methodology 700 for controlling a dynamic location for a trip of a vehicle is illustrated. The methodology starts at 702, and at 704 an input requesting the trip of the vehicle is received. The input specifies an identity of a user and a specific time. At 706, responsive to the input, the dynamic location for the trip of the vehicle is set as a location of the user at the specific time. At 708, the methodology 700 includes causing the vehicle to move to the dynamic location. The methodology 700 concludes at 710.

In an embodiment, the user differs from a second user. The input further specifies setting a destination for the trip to meet the user. The input is requesting the trip of the vehicle for the second user to ride in the vehicle.

In another embodiment, the vehicle is an autonomous vehicle in a fleet of autonomous vehicles. In an embodiment, the dynamic location for the trip of the vehicle is a pick-up location for a trip of the vehicle. In a further embodiment, the dynamic location for the trip of the vehicle is a drop-off location for the trip of the vehicle.

In one embodiment, the location of the user at the specific time is an anticipated location of the user at a specific future time. The specific future time being after a time of receipt of the input. In another embodiment, the location of the user at the specific time is a prior location of the user at a specific prior time. The specific prior time being before a time of receipt of the input. In yet another embodiment, the dynamic location for the trip of the vehicle is dynamically adjusted based on a modification to the location of the user at the specific time.

Referring now to FIG. 8, an exemplary methodology 800 for controlling a dynamic location for a trip of a vehicle is illustrated. The methodology starts at 802, and 804 a suggestion for a destination is transmitted to a user. The suggestion includes a second user and a specific time. At 806, an input requesting the trip of the vehicle is received. The input specifies setting a destination for the trip to meet the second user. At 808, responsive to the input, the dynamic location for the trip of the vehicle is set as a location of the second user at the specific time. At 810, the methodology 800 includes causing the vehicle to move to the dynamic location. The methodology 800 concludes at 812.

Figure 9:
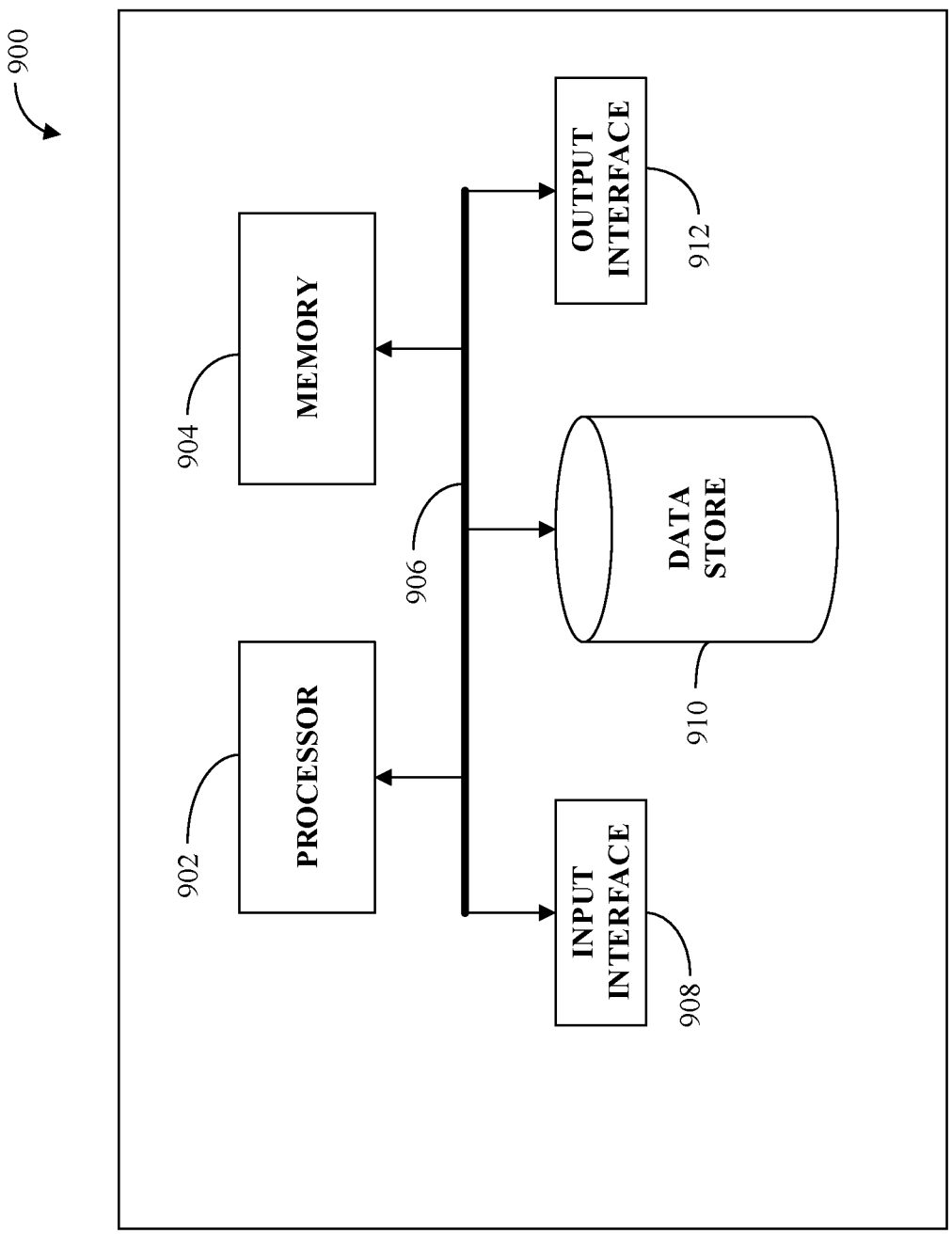
FIG. 9 illustrates an exemplary computing system.

Referring now to FIG. 9, a high-level illustration of an exemplary computing device that can be used in accordance with the systems and methodologies disclosed herein is illustrated. For instance, the computing device 900 may be or include the mobile computing device or the computing system. The computing device 900 includes at least one processor 902 that executes instructions that are stored in a memory 904. The instructions may be, for instance, instructions for implementing functionality described as being carried out by one or more components discussed above or instructions for implementing one or more methods described above. The processor 902 may be a GPU, a plurality of GPUs, a CPU, a plurality of CPUs, a multi-core processor, etc. The processor 902 may access the memory 904 by way of a system bus 906. In addition to storing executable instructions, the memory 904 may also store roadways, user identification, user preferences, etc.

The computing device 900 additionally includes a data store 910 that is accessible by the processor 902 by way of the system bus 906. The data store 910 may include executable instructions, roadways, user identification, user preferences, etc. The computing device 900 also includes an input interface 908 that allows external devices to communicate with the computing device 900. For instance, the input interface 908 may be used to receive instructions from an external computer device, from a user, etc. The computing device 900 also includes an output interface 912 that interfaces the computing device 900 with one or more external devices. For example, the computing device 900 may display text, images, etc. by way of the output interface 912.

Additionally, while illustrated as a single system, it is to be understood that the computing device 900 may be a distributed system. Thus, for instance, several devices may be in communication by way of a network connection and may collectively perform tasks described as being performed by the computing device 900.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Application Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. An autonomous vehicle, comprising:
   a vehicle propulsion system;
   a braking system;
   a steering system; and
   a computing system that is in communication with the vehicle propulsion system, the braking system, and the steering system, wherein the computing system comprises:
      a processor; and
      memory that stores computer-executable instructions that, when executed by the processor, cause the processor to perform acts comprising:
         receiving, from a computing device of a first passenger, an input requesting a trip of the autonomous vehicle for the first passenger, wherein the input requests that the first passenger be dropped off at a drop-off location for a differing trip of a second autonomous vehicle that provides the differing trip for a second passenger;
         setting a destination for the trip in the autonomous vehicle for the first passenger based on the input, the destination for the trip of the autonomous vehicle for the first passenger being set as an anticipated drop-off location of the second autonomous vehicle, wherein the second autonomous vehicle travels along a differing route for the differing trip to the anticipated drop-off location selected by the second passenger of the second autonomous vehicle;
         selecting a route to the destination for the trip of the autonomous vehicle;
         controlling at least one of the vehicle propulsion system, the braking system, or the steering system to move the autonomous vehicle along the route to the destination as selected for the trip;
         receiving an indication that the second autonomous vehicle has changed the drop-off location from the anticipated drop-off location to a modified drop-off location;
         responsive to receiving the indication, setting the modified drop-off location as a modified destination from the trip of the autonomous vehicle for the first passenger;
         selecting a second route to the modified destination for the trip of the autonomous vehicle for the first passenger; and
         controlling at least one of the vehicle propulsion system, the braking system, or the steering system to move the autonomous vehicle along the second route to the modified destination.

2. The autonomous vehicle of claim 1, wherein the differing trip of the second autonomous vehicle is a current trip of the second autonomous vehicle, wherein the current trip of the second autonomous vehicle is ongoing at a time of receipt of the input.

3. The autonomous vehicle of claim 1, wherein the differing trip of the second autonomous vehicle is a future trip of the second autonomous vehicle, wherein a time of receipt of the input is before commencement of the future trip of the second autonomous vehicle.

4. The autonomous vehicle of claim 1, wherein the second autonomous vehicle is selected from a fleet of autonomous vehicles based on the input requesting the trip to meet the second passenger of the second autonomous vehicle.

5. The autonomous vehicle of claim 1, the acts further comprising:
   transmitting to the computing device of the first passenger a suggested destination, wherein the suggested destination comprises the drop-off location for the differing trip of the second autonomous vehicle that provides the differing trip for the second passenger.

6. The autonomous vehicle of claim 1, wherein selecting the route to the destination for the trip of the autonomous vehicle includes determining an initial geolocation of the autonomous vehicle based on a sensor system in the autonomous vehicle.

7. A method of controlling an autonomous vehicle, comprising:
   receiving, from a computing device of a first passenger, an input requesting a trip of the autonomous vehicle for the first passenger, wherein the input requests that the first passenger be dropped off at a drop-off location for a differing trip of a second autonomous vehicle that provides the differing trip for a second passenger;
   setting, responsive to the input, a first destination for the trip of the autonomous vehicle for the first passenger, the first destination for the trip of the autonomous vehicle for the first passenger being set as an anticipated drop-off location of the second autonomous vehicle, wherein the second autonomous vehicle travels along a differing route for the differing trip to the anticipated drop-off location selected by the second passenger;

selecting a route to the first destination for the trip of the autonomous vehicle for the first passenger;

causing the autonomous vehicle to travel along the route to the first destination;

receiving an indication that the second autonomous vehicle has changed the drop-off location from the anticipated drop-off location to a modified drop-off location;

setting, responsive to receiving the indication, the modified drop-off location as a modified destination for the trip of the autonomous vehicle for the first passenger;

selecting a second route to the modified destination for the trip of the autonomous vehicle for the first passenger; and causing the autonomous vehicle to travel along the second route to the modified destination.

8. The method of claim 7, wherein the drop-off location for the differing trip of the second autonomous vehicle is suggested to the first passenger, wherein the input specifies selection of the drop-off location for the differing trip of the second autonomous vehicle as suggested for the trip to meet the second autonomous vehicle.

9. The method of claim 7, wherein the autonomous vehicle and the second autonomous vehicle are in a fleet of autonomous vehicles.

10. The method of claim 7, wherein the second autonomous vehicle traveling along the differing route for the differing trip for the second passenger is ongoing at a time of receipt of the input.

11. The method of claim 7, wherein the input specifies an identity of the second autonomous vehicle.

12. The method of claim 7, wherein the autonomous vehicle and the second autonomous vehicle are in a fleet of autonomous vehicles.

13. The method of claim 7, wherein selecting the route to the first destination for the trip of the autonomous vehicle for the first passenger includes determining an initial geolocation of the autonomous vehicle based on a sensor system in the autonomous vehicle.

14. The method of claim 7, further comprising:
transmitting to the computing device of the first passenger a suggested destination, wherein the suggested destination comprises the drop-off location for the differing trip of the second autonomous vehicle that provides the differing trip for the second passenger.

15. The method of claim 7, wherein causing the autonomous vehicle to travel along the second route to the modified destination comprises controlling at least one of a vehicle propulsion system, a braking system, or a steering system to move the autonomous vehicle along the second route to the modified destination as selected for the trip.

16. The method of claim 7, wherein the differing trip of the second autonomous vehicle is a future trip of the second autonomous vehicle, wherein a time of receipt of the input is before commencement of the future trip of the second autonomous vehicle.

17. An autonomous vehicle, comprising:
a vehicle propulsion system;
a braking system;
a steering system; and
a computing system that is in communication with the vehicle propulsion system, the braking system, and the steering system, wherein the computing system comprises:
a processor; and
memory that stores computer-executable instructions that, when executed by the processor, cause the processor to perform acts comprising:
receiving, from a computing device of a first passenger, an input requesting a trip in the autonomous vehicle for the first passenger, wherein the input requests that the first passenger be dropped off at a location of a second autonomous vehicle that provides a differing trip for a second passenger to allow the first passenger to switch to riding in the second autonomous vehicle as the second autonomous vehicle travels along a second route toward a second destination selected by the second passenger;
setting a destination for the trip in the autonomous vehicle for the first passenger based on the input, the destination for the trip of the autonomous vehicle for the first passenger being set as an anticipated location of the second autonomous vehicle at a specific time as the second autonomous vehicle travels along the second route;
selecting a route to the destination for the trip of the autonomous vehicle;
controlling at least one of the vehicle propulsion system, the braking system, or the steering system to move the autonomous vehicle along the route to the destination as selected for the trip; and
stopping the autonomous vehicle at the destination for the trip of the autonomous vehicle, wherein the second autonomous vehicle is simultaneously stopped at the destination for the trip of the autonomous vehicle to allow the first passenger to enter the second autonomous vehicle.

18. The autonomous vehicle of claim 17, the acts further comprising:
receiving an indication that the anticipated location of the second autonomous vehicle at the specific time has changed to a modified location;
setting, responsive to receiving the indication, the modified location as a modified destination for the trip of the autonomous vehicle for the first passenger;
selecting a second route to the modified destination for the trip of the autonomous vehicle for the first passenger; and
controlling at least one of the vehicle propulsion system, the braking system, or the steering system to move the autonomous vehicle along the second route to the modified destination.

19. The autonomous vehicle of claim 17, wherein selecting the route to the destination for the trip of the autonomous vehicle includes determining an initial geolocation of the autonomous vehicle based on a sensor system in the autonomous vehicle.

20. The autonomous vehicle of claim 17, wherein the differing trip for the second passenger is a future trip of the second autonomous vehicle, wherein a time of receipt of the input is before commencement of the future trip of the second autonomous vehicle.

* * * * *